(12) United States Patent
Alexander

(10) Patent No.: US 6,732,331 B1
(45) Date of Patent: May 4, 2004

(54) SYSTEM AND PROCESS FOR MANAGING CONTENT ORGANIZED IN A TAG-DELIMITED TEMPLATE USING METADATA

(76) Inventor: Vlad Alexander, 1910 11th St., Apt. A, Anacortes, WA (US) 98221

(*) Notice: Subject to any disclaimer, the term of this patent is extended or adjusted under 35 U.S.C. 154(b) by 0 days.

(21) Appl. No.: 09/504,624

(22) Filed: Feb. 15, 2000

(51) Int. Cl.$^7$ .......................... G06F 17/00; G06F 17/30
(52) U.S. Cl. ................ 715/513; 715/500.1; 715/501.1; 715/505; 715/506; 707/10
(58) Field of Search .............................. 715/513, 500.1, 715/505, 506; 707/10

(56) References Cited

U.S. PATENT DOCUMENTS 6,356,903 B1 * 3/2002 Baxter et al. ................. 707/10

OTHER PUBLICATIONS

"Mastering Microsoft Office 97", 1997, SYBEX, Professional Edition Second Edition, pp. 880, 881, 883, 884, 1003, 1004, 1006, and 1012.*

"The ABCs of Word 97", 1997 SYBEX, Second Edition, pp. 282–290 and 377–386.*

* cited by examiner

Primary Examiner—Stephen S. Hong
Assistant Examiner—Adam L. Basehoar
(74) Attorney, Agent, or Firm—Patrick J. S. Inouye

(57) ABSTRACT

A system and process for managing content organized in a tag-delimited template using metadata are described. A stored template written in a tag-delimited language is retrieved. The retrieved template is converted into an object representation of a metadata entry form. A user interface exported by the object representation is initialized. A data entry form is built including individual data entry elements responsive to user selections on the user interface of the metadata form. Each data entry element includes a set of information attributes describing the data entry element. The data entry elements of the data entry form are defined as one or more classes within the retrieved template. The data entry form is rendered by enumerating each of the one or more classes of the stored template and generating each data entry element of the one or more enumerated classes as described by the set of information attributes.

51 Claims, 11 Drawing Sheets

| | | |
|---|---|---|
| 131 | Template Name | Bookstore |
| 132 | Document ID | 4827CF9E-B4A0-11D3-88B0-000000000000 |
| 104 | Title / Author | A Widow's Might |

Revision Note

Bookstore

136

Title
A Widow's Might

137 Re-publish Info
(nothing)
Second publisher sought
Republishing rights available 138 Synopsis A Widow's Might is a true story of a suddenly widowed mother with six young children. Left in the middle of the Depression when her preacher husband dies, this remarkable woman faces tremendous odds to keep her family together.

139 Authors' Bio

Carolyn Ellis Lipscomb is the fifth child of Henry and Mattie Ellis, the central figures of this book. Carolyn was born in Pine Apple, Alabama, but has spent most of her life in Auburn where she completed her degree at Auburn University. She now spends her time 140 Category
Non Fiction
Fiction
0-14 Years 141 RoseDog Member ID
3481727

142 Paid From Date
12/1/1999

143 Paid To Date
12/1/2000

144 Headshot Image
carolyn_lipscomb.jpg

A Widow's Might — 161
by Carolyn Ellis Lipscomb — 162

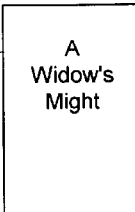

170

171

Synopsis — 163 — 164

*A Widow's Might* is a true story of a suddenly widowed mother with six young children. Left in the middle of the Depression when her preacher husband dies, this remarkable woman faces tremendous odds to keep her family together.

This is an inspiring story of courage, dignity, grace, and heart that overcame severe hardships of the '30s Depression and beyond. Set in Auburn, Alabama the heroine is a Methodist minister's widow and the hero is a mild-mannered, generous man who was misunderstood by some of his family. "For the first time in her long life, Mama felt that her reputation had been questioned and that her testimony on the witness stand was necessary to prove that her morals and integrity were beyond reproach.".

Our society needs to hear this story of a person succeeding under adversities which do not exist today, and depending on her own initiative, perseverance, and faith, to succeed.

Author Bio — 165 — 166

Carolyn Ellis Lipscomb is the fifth child or Henry and Mattie Ellis, the central figures of this book. Carolyn was born in Pine Apple, Alabama, but has spent most of her life in Auburn where she completed her degree at Auburn University. She now spends her time with her four grown children, who have all moved back to Auburn, and also travels, writes, plays the piano and organ and spoils her nine grandchildren. Her book on the history of the Auburn United Methodist Church received the Church Heritage Award from the Alabama-West Florida Conference.

167 — Purchase This Book From
    Amazon
         — 168     — 169
Excerpt

In 1937 we had to move. The only house Mama found that she could afford to rent was at 142 Donahue Drive, and the rent was $15 a month. It was a small frame house, four rooms with a sleeping porch, and a bathroom, once again, at the end of the back porch. There was a pasture that we shared with three other families and each family had a cow. My brothers had to take turns milking our cow, Princess. That was a chore which caused much grumbling, but we always had plenty of milk and butter. The butter had to be churned, and we took turns doing that. A special treat was when Mama made pull candy and we had great fun pulling the long ropes of buttery candy until it was smooth and golden yellow, and then we cut the rope into bite-size pieces. It stuck to our teeth, but it tasted delicious.

The pasture and the houses surrounding it belonged to Mrs. Bernard Cowart, a widow of an A.P.I. professor who had bought large tracts of land in and around Auburn. He had built a number of rental houses on his land, so the Cowart family was probably one of the wealthiest families in Auburn. We didn't want to move to that little house, a long way from our friends and almost two miles from school. However, that move precipitated events years later which changed Mama's life—exciting and positive changes, though the realization of them created a great deal of stress and anxiety.

SYSTEM AND PROCESS FOR MANAGING CONTENT ORGANIZED IN A TAG-DELIMITED TEMPLATE USING METADATA

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates in general to Web content management and, in particular, to a system and process for managing content organized in a tag-delimited template using metadata.

BACKGROUND OF THE INVENTION

Currently, Web content published in tag-delimited, markup languages for presentation on browser clients is a popular form of digital data communication. A browser client, or simply "browser," is a computer application that interprets individual statements, delimited using tags, which describe the layout and substance of the content. The content can include, for example, textual, audio, and video communications, and can be static or interactive.

Although many markup languages exist, the Hypertext Markup Language (HTML) and the Extensible Markup Language (XML) are widely used due to their ability to be distributed and interpreted in an almost hardware-independent manner by browsers operating in a variety of hardware environments. For instance, digital data networks compliant with the Transmission Control Protocol/Internet Protocol (TCP/IP) use the Hypertext Transport Protocol (HTTP) to transfer markup language content organized into pages accessed over the so-called World Wide Web. These "Web" pages make content available for viewing on a browser in a hierarchically structured, easy to navigate fashion.

Collections of related Web pages are often organized into a single Web site that is rooted in a home page. The home page typically identifies the Web site based on some common domain name identifier. For instance, "www.RoseDog.com" is the home page of RoseDog.com™, a Web site headquartered in Seattle, Wash., which provides services for writers, agents and publishers. A client can navigate through the Web site beginning with the home page into successively linked Web pages identified by hyperlinks embedded within the content.

Although such content can be easy to access, each page must actually be encoded in the markup language as a self-contained document that is served by a Web server one page at a time. The one-page-per-service request requirement is a limitation resulting as a side effect of HTTP, which is a stateless protocol. Specifically, HTTP uses two main commands, "GET" and "POST," used by a client to specify a Web page to be retrieved and viewed. A separate Web page must be stored even if a pair of Web pages contains nearly identical content. This limitation can result in significant data duplication, which can be particularly inefficient if the content for each related Web page is organized in a similar structure. Moreover, revising the Web content can be a monumental task if wholesale changes to appearance and structure are required, as opposed to merely displaying new content.

One prior art approach to creating Web content creates Web pages directly incorporating the content with the structure. Many popular Web page publishing tools, such as Microsoft FrontPage, licensed by Microsoft Corporation, Redmond, Wash., and Dream Weaver, licensed by Macromedia, Inc., San Francisco, calif., generate Web pages hard-coded in HTML. The content can be modified by visually editing each Web Page with the page-publishing tool or by editing the raw HTML with a text editor. Neither approach easily accommodates wholesale changes to the appearance or structure of the Web pages, a limitation which can be particularly problematic for a Web site containing multiple, nearly identical Web pages. Furthermore, the text editor approach is unacceptable for a novice user lacking programming expertise.

Another prior art approach to creating Web content introduces a template within which the structure of each Web page is specified separately from the actual data. This type of template is used to create Web pages for viewing on a browser. These types of tools generate interpretable, proprietary scripts, such as Active Server Pages, licensed by Microsoft Corporation; WebObjects, licensed by Apple Computer, Cupertino Calif.; and ColdFusion, licensed by Allaire Corporation, Cambridge, Mass. These tools provide a runtime environment for inserting data objects into Web pages. Typically, the data used to populate these data objects is retrieved from proprietary data sources, such as Structured Query Language (SQL) databases and the final Web page is built by combining the interpretable scripts with the retrieved data to generate HTML source code. In addition, data insertion and modification can be an arduous task requiring custom database applications. Moreover, the data structures used by these data sources are often rigid and cannot be easily changed.

Therefore, what is needed is an approach to organizing content augmenting conventional Web content creation tools, such as content for use in Web pages, whereby the data stored in the Web page can be easily modified without writing custom data entry applications. What is also needed is an approach to loading complex data based on a structured template written in a non-proprietary manner. Such an approach would preferably use a standard markup language specifying metadata in a vendor-independent fashion and usable by existing Web content publishing tools and viewers.

SUMMARY OF THE INVENTION

The present invention provides a system and process for managing content, such as for use in Web pages and similar constructs, which generates templates containing data describing data, known as metadata. A user can design the structure of a series of related Web pages through a preferably graphical user interface. The data types and Web page structure are described and stored in the template as a dynamic content package of classes.

An embodiment of the present invention is a system and process for managing content organized in a tag-delimited template using metadata. A stored template written in a tag-delimited language is retrieved. The retrieved template is converted into an object representation of a metadata entry form. A user interface exported by the object representation is initialized. A data entry form is built including individual data entry elements responsive to user selections on the user interface of the metadata form. Each data entry element includes a set of information attributes describing the data entry element. The data entry elements of the data entry form are defined as one or more classes within the retrieved template. The data entry form is rendered by enumerating each of the one or more classes of the stored template and generating each data entry element of the one or more enumerated classes as described by the set of information attributes.

A further embodiment of the present invention is a system and process for managing Web content using metadata in a content management framework. A base template defining a set of properties of and characterizing one or more data entry controls for use in a data entry form is processed. The data entry controls and the properties are formed into classes comprising metadata. An interface of the base template that defines a public method with which the data entry form can be built is exposed. The data entry form is built as a set of Web page elements responsive to a call to the public method of the template. The one or more data entry controls within the data entry form for each metadata class are created. The one or more properties of the data entry form for each metadata class are set. The data entry form is rendered as source code in a tag-delimited page description language.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 7 is a screen shot, by way example, of a data entry form generated by the content management framework of FIG. 1;

FIG. 8 is a screen shot, by way example, of a populated Web page generated by the Web server of FIG. 1;

DETAILED DESCRIPTION

Figure 1:
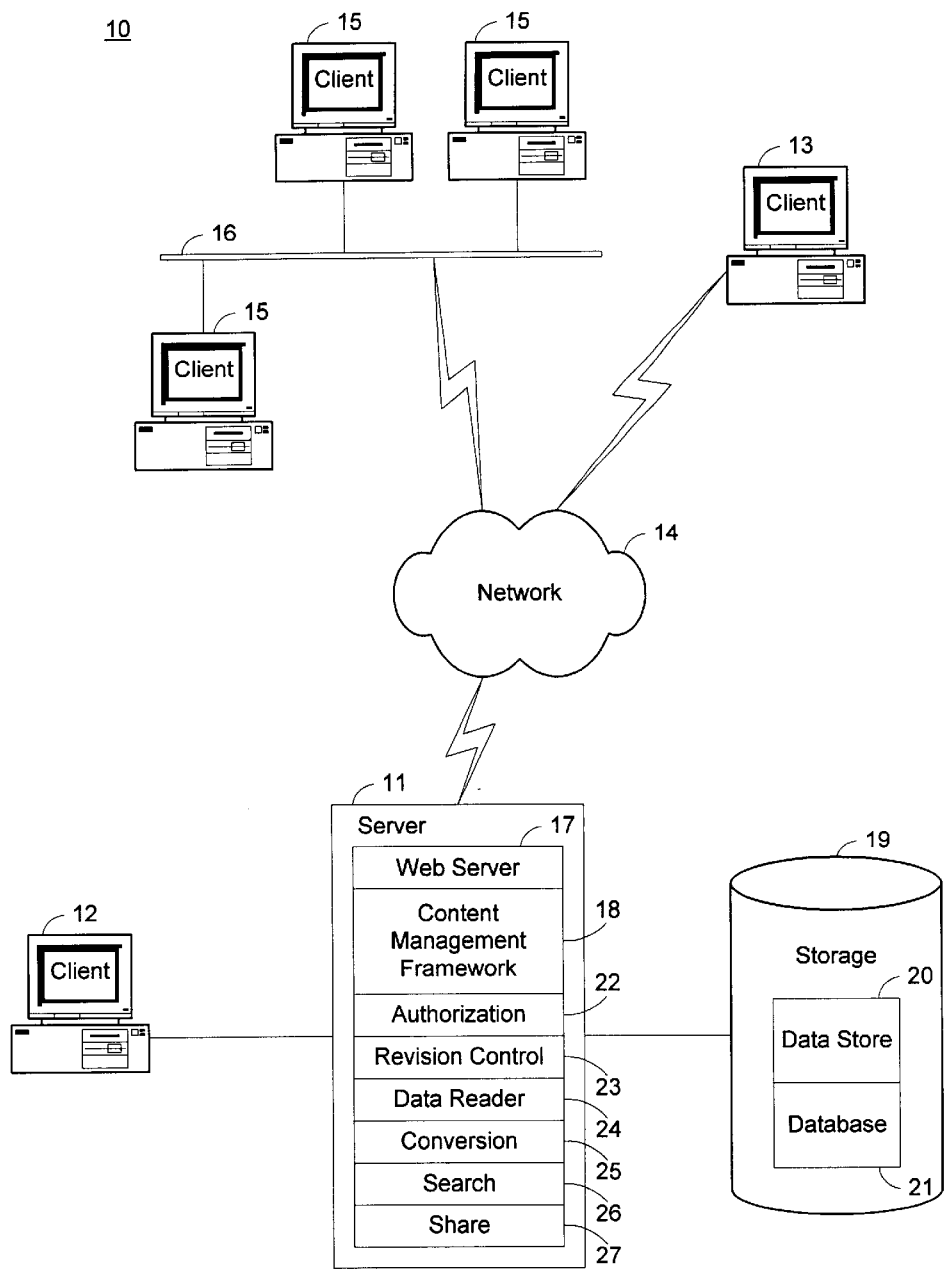
FIG. 1 is a functional block diagram showing a system for managing content organized in a tag-delimited template using metadata in accordance with the present invention.

FIG. 1 is a functional block diagram showing a system 10 for managing content organized in a tag-delimited template using metadata in accordance with the present invention. A centralized computer system configured as a server 11 in interconnected with a plurality of computer systems configured as clients. The clients include a local client 12, a remote client 13, and networked clients 15. The local client 12 is interconnected via a dedicated direct connection, such as a serial or dial-up link. The remote client 13 is interconnected via a wide area network (WAN) 14, such as an internetwork, including the Internet, and could also be interconnected via a dial-up link (not shown) through a public data information exchange. Finally, the networked clients 15 are locally interconnected via a local area network (LAN) 16 that is interconnected to the server 11 via the WAN 14. As shown, the LAN 16 is an intranetwork, but could equally be some form of internetwork, including the Internet, or some combination of intranetwork and internetwork. Other network topologies are possible. As used herein, the term "network" can refer to a WAN, LAN, and any form of computer system interconnectivity, as is known in the art.

The server 11 includes two applications, a Web server 17 and a content management framework 18. At a basic level, the Web server 17 services requests for Web pages received from the clients. Web pages are retrieved from a storage device 19 and sent to the requesting client. Alternatively, the Web page templates can be retrieved from storage 19, populated with data from the database 21 or data store 20, and sent to the requesting client. The Web server 17 and clients communicate using the HyperText Transport Protocol (HTTP). Typically, each Web page is written in the HyperText Markup Language (HTML), a popular form of tag-delimited language interpretable by client-side browser applications (not shown), although other tag-delimited languages, such as the Extensible Markup Language (XML) can also be used. In addition, the Web server 17 can include enhanced server-side functionality, such as available through Enterprise JavaBeans, Microsoft Active Server pages, and the like.

The content management framework 18 operates at a metadata level to manage the content of Web pages. Each Web page contains a sequence of tag-delimited statements, typically written in HTML. Content is described between a pair of "tags," either placed in line with the content or as paragraph markers. The content can take the form of text, attributes, hyperlinks, parameters, and virtually any type of subject matter to be served to a client. As described further below with reference to FIG. 2, the content management framework 18 enables a user to manage the arrangement, composition, and display attributes of Web page content as maintained in a data store 20 and database 21, both stored in the storage device 19.

In addition, the content management framework 18 can operate in conjunction with associated applications which work cooperatively with the content generated by the content management framework. These associated applications include the following, non-exclusive functional modules: authorization 22, revision control 23, data reader 24, conversion 25, search 26, and share 27.

Authorization module 22 controls access permissions to data managed by the content management framework 18. The purpose of this module is to provide authorized personnel with access to create, update and delete templates and data documents, as well as grant or deny access to view individual data elements on Web pages created from the data managed by the content management framework 18.

Revision control module 23 manages different revisions of content. The purpose of this module is to backup data, track changes, and maintain an audit trail of modifications to the data.

Data reader 24 module provides a tool for application developers which makes reading complex XML files easier. Data reader module 24 also works with authorization module 22 to filter out any data that a user of the data reader 24 is not permitted to access.

Conversion module 25 converts data based on one template into data based on another template. Templates are further described below with reference to FIG. 5.

Search module 26 provides the ability to search through data documents.

Finally, share module 27 enables data to be exchanged across systems or organization boundaries. Share module 27 works with authorization module 22 to limit exchanged data to only that data to which the participants are authorized. Share module 27 also works with conversion module 25 to facilitate exchanging data based on different template structures.

The foregoing list of associated applications is not exhaustive and other functional modules would be readily apparent to one skilled in the art.

The individual computer systems, including the server 11, and clients 12, 13, 15 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. In the described embodiment, each client is preferably equipped with a browser application with which to request and receive Web pages and related content. The server 11 is preferably a network server class computer system, such as a PowerEdge network server, manufactured by Dell Computers, Inc., Austin, Tex., and running a server-capable operating system, such as Linux, a free and publicly available operating system, or Windows NT Server, licensed by Microsoft Corporation, Redmond, WA.

Figure 2:
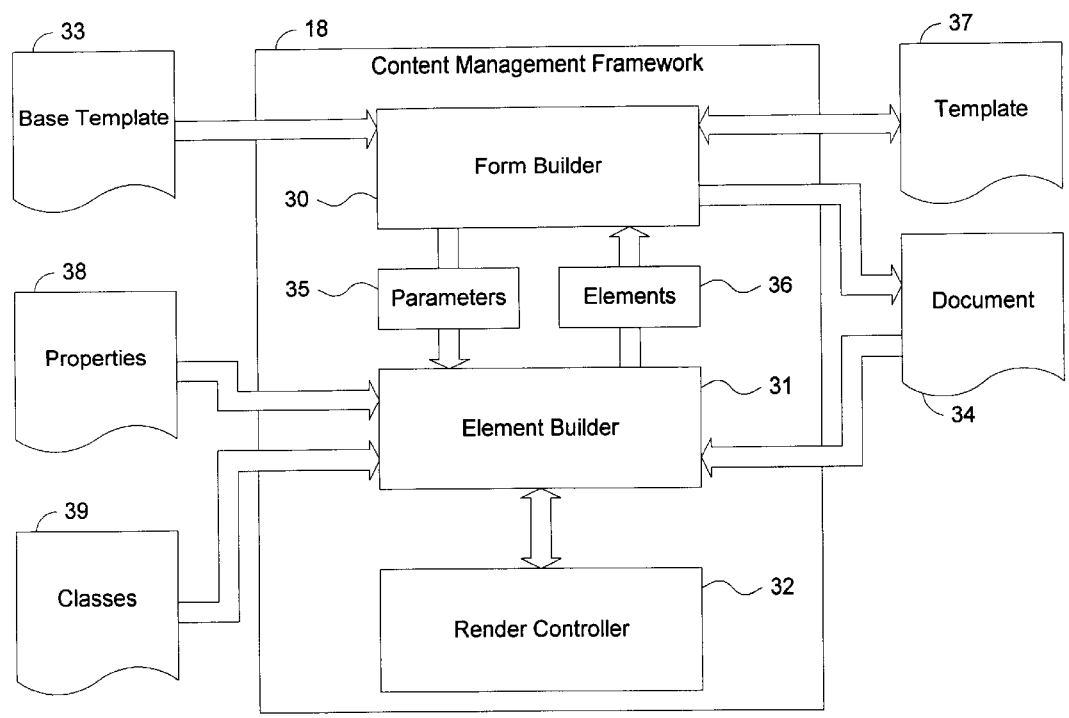
FIG. 2 is a block diagram showing the functional software modules of the content management framework of FIG. 1.

FIG. 2 is a block diagram showing the functional software modules of the content management framework 18 of FIG. 1. Each module is a computer program written as source code in a conventional programming language, such as the VisualBasic or the Java programming languages, and is presented for execution by the CPU as object or byte code, as is known in the art. The various implementations of the source code and object and byte codes can be held on a computer-readable storage medium or embodied on a transmission medium in a carrier wave. In the described embodiment, the software modules are preferably written in accordance with the Common Object Model (COM), such as described in D. Chappell, "Understanding ActiveX and OLE," Chs. 1–5, Microsoft Press (1996), the disclosure of which is incorporated herein by reference.

The content management framework 18 includes three main modules: form builder 30, element builder 31, and render controller 32. The form builder 30 creates a metadata template 37, which describes a data entry document 34. The template 37 is generated from a base template 33, as further described below in the content management framework object model 60 with reference to FIG. 5. The template 37 is either built new or updated, depending whether an existing template 37 has been referenced as an input parameter to the content management framework 18.

The document 34 is logically divided into top and bottom sections between which are placed controls. The sections and controls constitute Web page elements 36 which are generated by the element builder 31 responsive to input parameters 35 received from the form builder 30. The element builder 31 defines each element 36 based on a set of properties 38 and recursively definable classes 39.

Finally, the render controller 32, includes control, validator, and adapter objects, which operate to map content to controls. Content is mapped into individual elements and validated for data type. In addition, each control is rendered, preferably in a tag-delimited language, such as HTML, suitable for use as a Web page. The content management framework 18 operates in accordance with a sequence of process steps, as further described below beginning with reference to FIG. 9.

Figure 3:
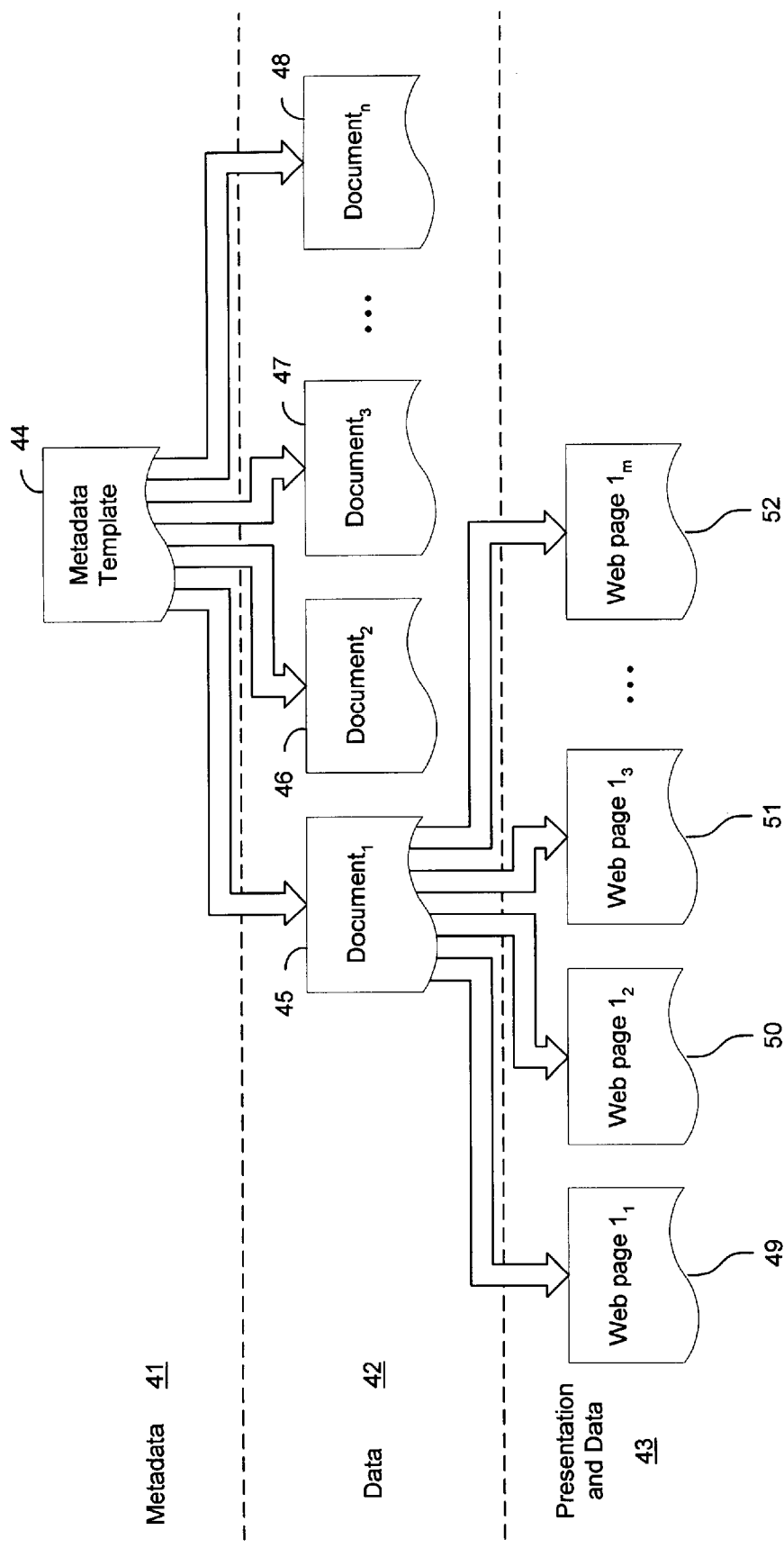
FIG. 3 is a hierarchical diagram of an ancestor tree of the content within Web pages as generated by the system of FIG. 1.

FIG. 3 is a hierarchical diagram of an ancestor tree 40 of the content within Web pages as generated by the system 10 of FIG. 1. The content is hierarchically structured into three logical layers: metadata layer 41, data layer 42, and presentation and data layer 43. In addition, a fourth layer (not shown) exists above the metadata layer 41 for the base template 33 (shown in FIG. 2) to which the ancestor tree 40 is rooted.

The metadata layer 41 includes one or more metadata template 44 (corresponding to the template 37 shown in FIG. 2) which each describe information about the data stored in Web pages 49–52 in the presentation and data layer 43. One or more documents 45–48 (corresponding to the document 34 shown in FIG. 2) are generated from the metadata template 44 by the content management framework 18. In turn, each document 45–48 can be used to generate the individual Web pages 49–52. Consequently, there is a one-to-many relationship between the base template 33 and the metadata template(s) 44, a one-to-many relationship between each metadata template 44 and the documents 45–48, and a one-to-many relationship between each document 45 and the Web pages 49–52.

Figure 4:
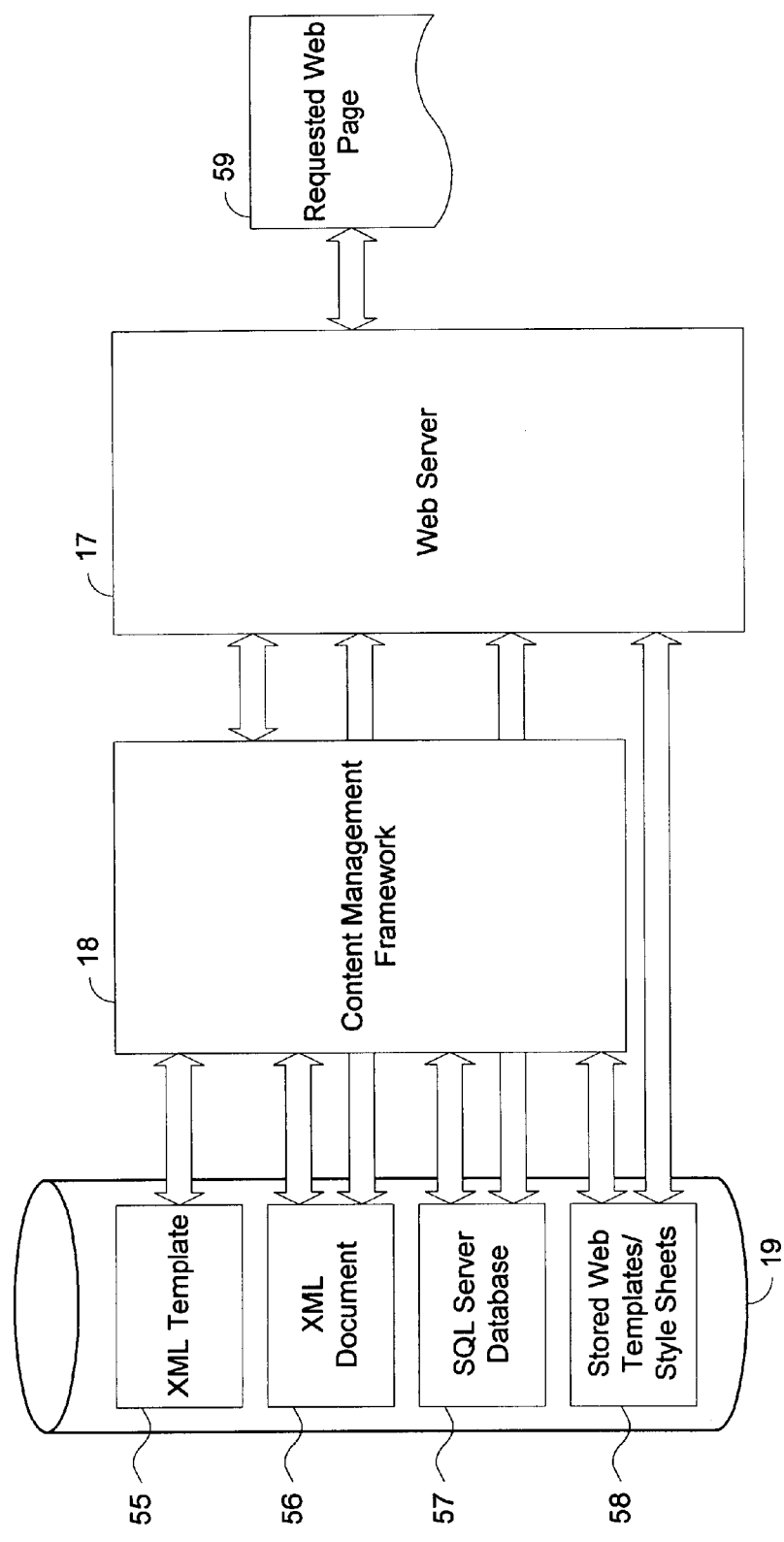
FIG. 4 is a process diagram showing the flow of information through the system of FIG. 1.

FIG. 4 is a process diagram showing the flow of Web content through the system 10 of FIG. 1. In the described embodiment, an XML template 55 and an XML document 56 are stored in the data store 20, and a SQL server database 57 is maintained as the database 21, although other arrangements of data structuring and storage are possible. The content management framework 18 retrieves the XML template 55 from which the XML document 56 is built. Upon a request from a client, the Web server 17 retrieves the XML document 56 which is combined with metadata retrieved from the SQL server database 57 and stored Web templates and style sheets 58. In the described embodiment, the Web templates are written as proprietary scripts, such as Microsoft Active Server Pages, and the style sheets are written in the Extensible Stylesheet Language (XSL). The resultant Web page 59 is served to the requesting client. Alternatively, the XML document 56 can be combined with the stored Web templates and style sheets 58 and sent directly by the Web server 17.

Figure 5:
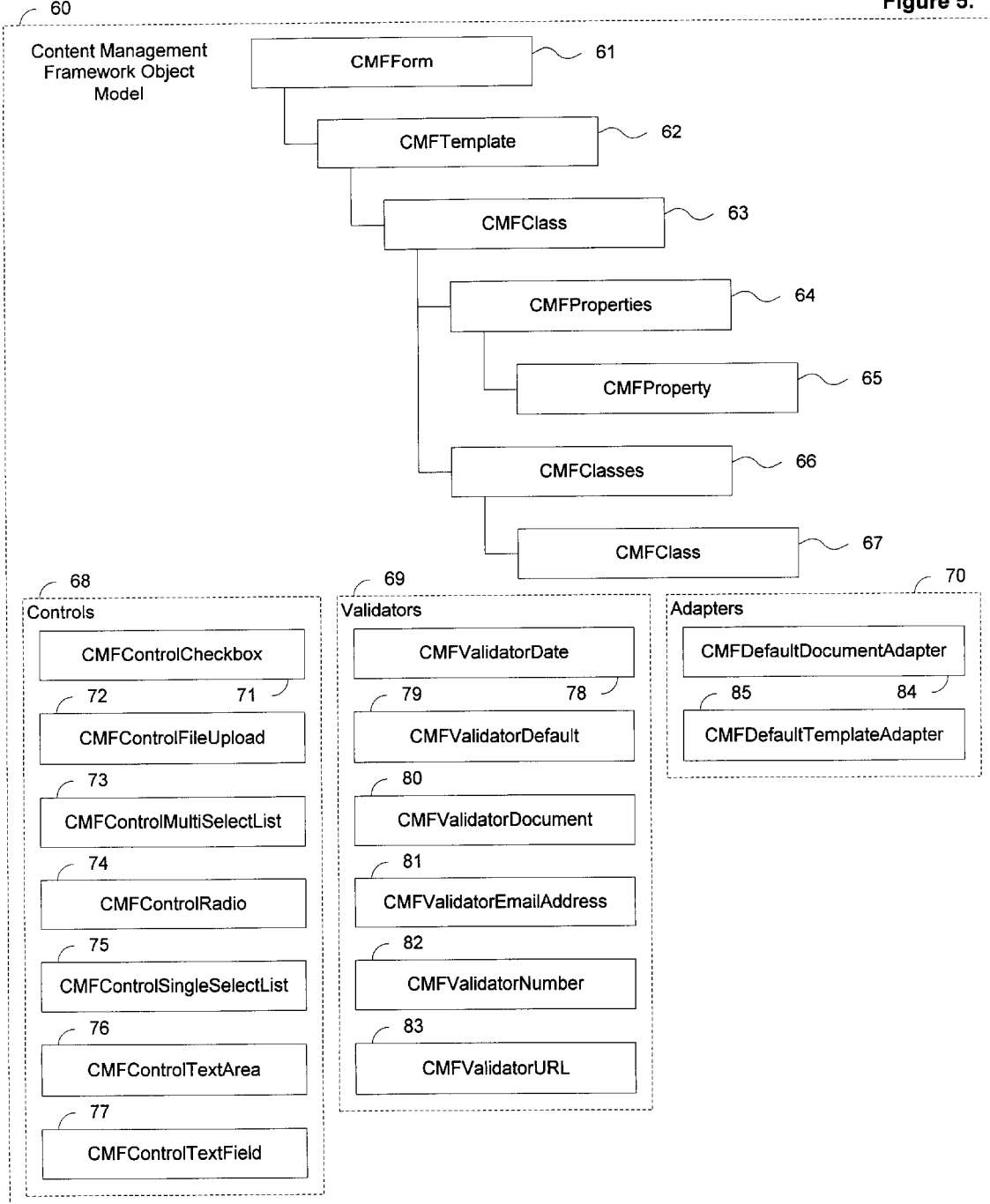
FIG. 5 is an object model diagram of the content management framework of FIG. 1.

FIG. 5 is an object model diagram 60 of the content management framework 18 of FIG. 1. The content management framework 18 can be logically categorized into classes contained by the CMFForm class 61 and into three groups of classes relating to controls 68, validators 69, and adapters 70. The CMFForm class 61 and related classes will now be described.

The CMFForm class 61 is the root class of the content management framework 18. The purpose of this class is to provide an application programming interface (API) entry point into the content management framework 18 via a single public method, ProcessRequest( ). The CMFForm class 61 contains a CMFTemplate class 62 that defines an object-oriented representation of an XML template. The CMFTemplate class 62 contains a CMFClass class 63, which represents a grouping of data types which can contain a class of the same type. For instance, the CMFClass class 63 can contain a CMFProperties collection 64 of one or more CMFProperty objects 65 (one object shown) and a CMFClasses collection 66 of one or more CMFClass classes 67 (one class shown). The CMFProperties collection 64 is a collection of CMFProperty objects 65 and the CMFClasses collection 66 is a collection of CMFClass classes 67. Each CMFProperty object 65 stores data. Each CMFClass object 67 can recursively contain CMFProperty objects and CMFClasses collections.

The three remaining groups of classes can be logically categorized as relating to controls 68, validators 69, and adapters 70. The controls class group 68 contains seven classes. The CMFControlCheckbox class 71 is responsible for rendering an HTML checkbox control:<INPUT type="checkbox">. The CMFControlFileUpload class 72 is responsible for rendering an HTML file upload control:<INPUT type="file">. The CMFControlMultiSelectList class 73 is responsible for rendering an HTML list box control:<SELECT multiple>. The CMFControlRadio class 74 is responsible for rendering an HTML radio button control:<INPUT type="radio">. The CMFControlSingleSelectList class 75 is responsible for rendering an HTML list box control:<SELECT>. The CMFControlTextArea class 76 is responsible for rendering an HTML multi-line text field control:<TEXTAREA>. Finally, the CMFControlTextField class 77 is responsible for rendering an HTML single-line text field control:<INPUT type="text">. Other control classes are feasible.

The validators class group 69 contains six classes. The CMFValidatorDate class 78 is responsible for validating date data types. The CMFValidatorDefault class 79 is responsible for validating string data types. The CMFValidatorDocument class 80 is responsible for validating links to other content managed by the content management framework 18. The CMFValidatorEmailAddress class 81 is responsible for validating data in the form of an email address. The CMFValidatorNumber class 82 is responsible for validating numeric data types. Finally, the CMFValidatorURL class 83 is responsible for validating data in the form of a Uniform Resource Locator (URL). Other validator classes are feasible.

The adapters class group 70 contains two classes. Each adapter class performs two tasks: communicating with external systems, and (2) rendering a portion of each data entry form for capturing revision notes, content name, and other metadata. Custom adapters can be written for each template to capture additional information about the content of the data entry form or to redirect data to external systems. The CMFDefaultDocumentAdapter 84 class is responsible for rendering HTML controls for capturing metadata about content as well as persisting the metadata to the database 21. CMFDefaultTemplateAdapter class 85 is responsible for rendering HTML controls for capturing metadata about templates as well as persisting the metadata to the database 21.

Figure 6:
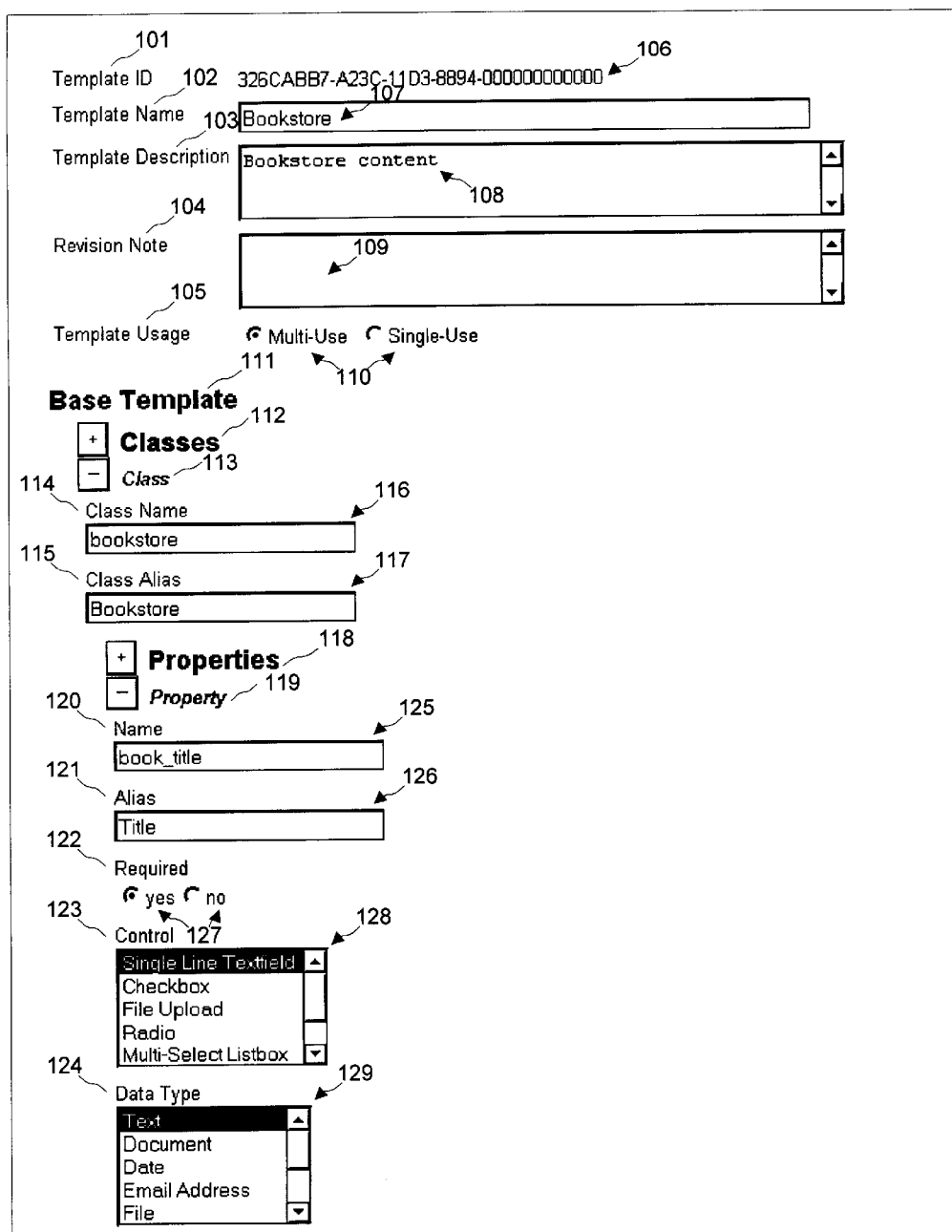
FIG. 6 is a screen shot, by way example, of a metadata template generated by the content management framework of FIG. 1.

An example of metadata, a blank form, and a specific Web page built therefrom is described with reference to FIGS. 6–8. The example presented is a series of Web page excerpts containing highly customizable content regarding authors and their works, presented in the form of an on-line bookstore. FIG. 6 presents an example of metadata. FIG. 7 presents an example of a data entry form based on that metadata. FIG. 8 presents an example of a Web page built from content entered into that data entry form. Through the use of the content management framework 18, the content of Web pages can be easily modified through the manipulation of the data entry form.

Beginning with metadata, FIG. 6 is a screen shot, by way example, of a metadata template 100 generated by the content management framework 18 of FIG. 1. The purpose of the metadata template 100 is to allow a user to control the format and content of a data entry form, such as data entry form 130 described below with reference to FIG. 7. In turn, the data entry form can be used to generate a Web page, such as the populated Web page 160 described below with reference to FIG. 8.

The metadata template 100 visualizes the content management framework object model 60 (shown in FIG. 5). Thus, the properties associated with the root CMFForm class 61 include, non-exclusively, a template identifier 101, a template name 102, a template description 103, any optional revision note 104, and a template usage flag 105. In the described embodiment, the template identifier 101 is a globally unique identifier (GUID) 106, here, set to "326CABB7-A23C-11D3-8894-000000000000." In addition, the template name 102 includes a single line data entry field 107, here, set to "Bookstore." The template description 103 and revision note 104 both include a multi-line data entry field 108, here, respectively set to a single entry "Bookstore content" 108 and an empty entry 109. Finally, the template usage flag 105 includes a pair of radio buttons 110, here, set to "Multi-Use." Other forms of data entry fields and controls are feasible and the foregoing is merely presented by way of illustrative example.

The metadata template 100 is based on a collection of classes in the base template 33 (shown in FIG. 2), which corresponds to the visualization of the CMFTemplate class 62. An instance of the CMFTemplate class 62 contains an instance of CMFClass class 63 with an alias, labeled "Base Template" 111. The CMFClass class 63 instance has no associated CMFProperties object 64 but does include a CMFClasses object 66, labeled "Classes" 112. In turn, the CMFClasses object 66 contains a CMFClass object 67, labeled "Class" 113, with two properties, Class Name 114 and Class Alias 115, and one CMFClasses collection 66, labeled "Properties" 118. Class Name 114 and Class Alias 115 include single line entry fields 116 and 117, and respectively set to "bookstore" and "Bookstore." Similarly, the Properties 38, here, is instantiated to a Property class 119 and contains five properties, Name 120, Alias 121, Required flag 122, Control 123, and Data Type 124. Both the Name 120 and Alias 121 properties include single line entry fields 125 and 126, respectively set to "book_title" and "Title." Required flag 122 includes a pair of radio buttons 127, here, set to "yes." Finally, Control 123 and Data Type 124 both include list boxes 128 and 129, respectively set to "Single Line Textfield" and "Text."

The metadata template 100 defines a data entry form from a data management perspective. The included properties 38 and classes 39 (shown in FIG. 2) define the appearance and behavior of a data entry form. FIG. 7 is a screen shot, by way example, of a data entry form 130 generated by the content management framework 18 of FIG. 1. The data entry form 130 is built using the metadata defined in the metadata template 100. Each data entry form generated from the metadata template 100 could conceivably be different. Consequently, the data entry form 130 includes a document identifier 131 that is a GUID 106, here, set to "4827CF9E-

B4A0-11D3-88B0-000000000000." The remainder of the data entry form 130 includes fields and labels specific to the content of the target Web page and, in particular, the recursively definable objects begin with the "Bookstore" label 135. Thus, the data entry form includes a title/author label 132 associated with a single line data entry field 133, here, set to the book title, "A Widow's Might." The revision note 104 includes a multi-line data entry field 139, which is empty.

As described above with reference to FIG. 7, a CMFTemplate class 62 is visualized through an instance of a CMFClass class 63 and an instance of a CMFProperties class 64 encapsulated therein. The properties of the CMFClass class 63 include the Class Alias 115 (shown in FIG. 6), here, rendered as "Bookstore" label 135. Similarly, the first property of the CMFProperty class 65, Property 119, are rendered as "Title" label 136 and single line entry field 145, here, set to "A Widow's Might." The properties of single line entry field 145 include Name 120, Alias 121, Required flag 122, Control 123, and Data Type 124. Thus, in addition to "Title" label 136, corresponding to Name 120 and Alias 121, single line entry field 145 is limited to one, required text field, corresponding to Required flag 122, Control 123, and Data Type 124. The metadata template 100 in a similar fashion defines the remaining fields and labels. The labels include "Re-publish Info" label 137, "Synopsis" label 138, "Authors' Bio" label 139, "Category" label 140, "RoseDog Member ID" label 141, "Paid From Date" label 142, "Paid To Date" label 143, and "Headshot Image" label 144. These labels are respectively associated with list box 146; multiline entry fields 147 and 148; list box 149; single line entry fields 150, 151, 152; and file upload field 153. Other forms of appearance, structure, and content organization are feasible.

The content of the data entry form 130 can be used to generate a specific Web page. FIG. 8 is a screen shot, by way example, of a populated Web page 160 generated by the Web server of FIG. 1. Web page 160 can be easily revised in terms of content using the data entry form 130 and in terms of appearance and structure using the metadata template 100. The data entered via the data entry form 130 is rendered into Web page 160 in a format defined by the metadata template 100, to include: a title "A Widow's Might" 161, author's name "Carolyn Ellis Lipscomb" 162, "Synopsis" label 163, synopsis content 164, "Author Bio" label 165, author's biography content 166, hyperlink to the "Amazon" Web site 167, "Excerpt" label 168, excerpt content 169, book cover graphic 170, and author photograph graphic 171. Other forms of appearance, structure, and content will vary dependent upon the metadata template 100 and data entry form 130.

Figure 9:
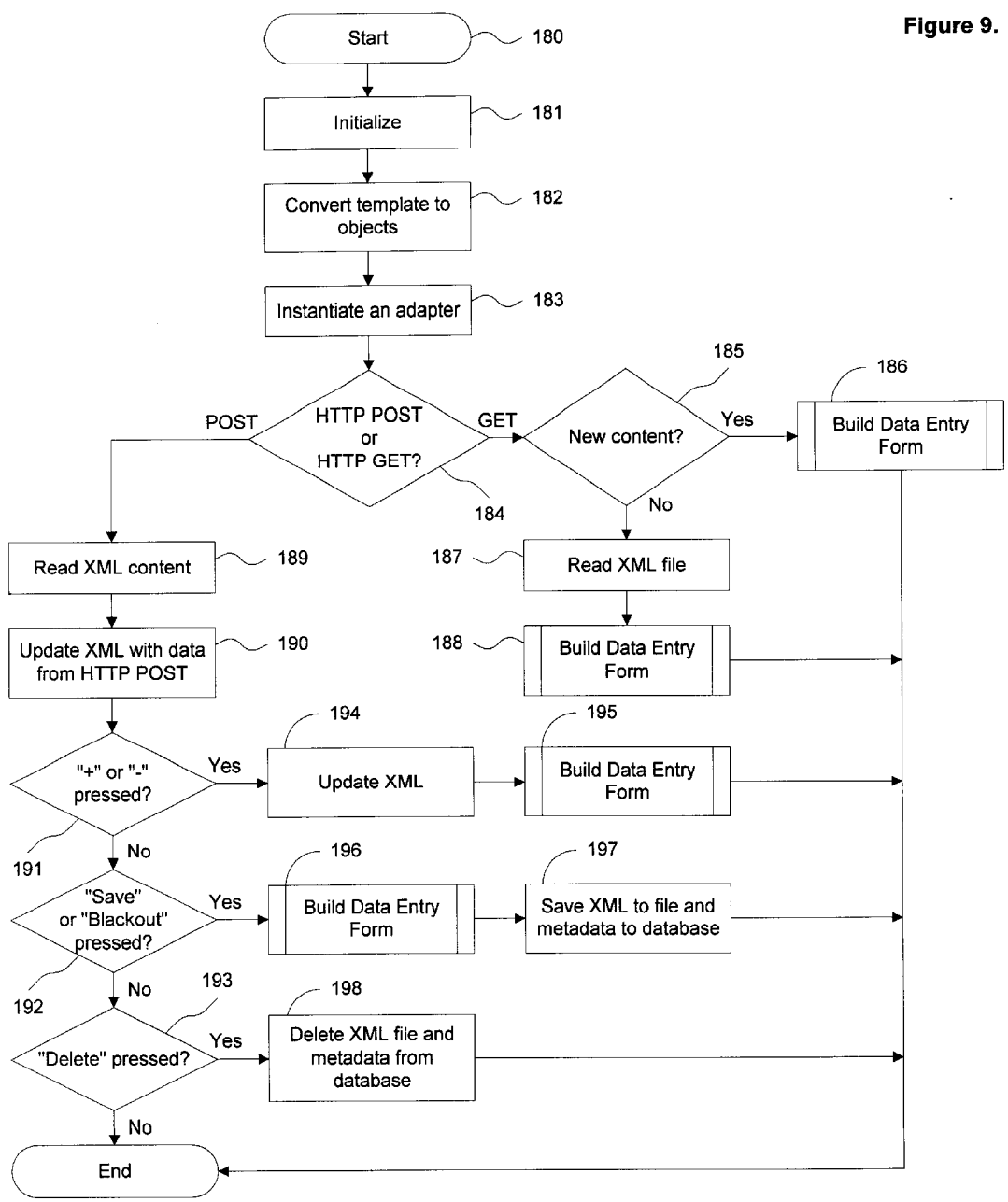
FIG. 9 is a flow diagram showing a process for managing content organized in a tag-delimited template using metadata in accordance with the present invention.

FIG. 9 is a flow diagram showing a process 180 for managing content organized in a tag-delimited template using metadata in accordance with the present invention. The process operates in three logical phases: initialization and setup (blocks 181–183), form building (blocks 185–188), and form updating (blocks 189–198). The initialization and setup phase will now be described.

In the described embodiment, the content management framework 18 is started upon the receipt of an HTTP "GET" request. As described above with reference to FIG. 5, the CMFForm class 61 is the root class of the content management framework 18 and exports a single method, ProcessRequest( ). In response to the receipt of the HTTP "GET" request, the root class CMFForm class 61 is instantiated and the properties of the CMFForm class 61 instance are set. The ProcessRequest( ) method is then called with the following parameters, as used, by way of example, in the described embodiment: a template identifier for the template to be used (required) and a content identifier for the document to be used (optional). A VBScript code segment for the Microsoft Active Server Pages environment for starting the content management framework 18 is as follows:

Dim objCMFForm
Set    objCMFForm=Server.CreateObject ("Bluebox.CMFForm")
objCMFForm.UserID=Session("DB_USERNAME")
objCMFForm.Password=Session("DB_PASSWORD")
objCMFForm.OnSaveNavigateTo="cmfpublish.asp"
objCMFForm.OnDeleteNavigateTo="cmfsearch.asp"
objCMFForm.OnCancelNavigateTo="cmfsearch.asp"
objCMFForm.ProcessRequest
Set objCMFForm=Nothing Next, initialization begins (block 181). During initialization, an instance of the CMFTemplate class 62 is created, a list representing a cookie map is built, and the path names of relevant files within the file system are obtained from the system Registry. Every HTML form element is given a unique name in the form of a GUID, which is used to determine information about each form element during request processing. Consequently, if a content identifier was not provided as an input parameter, encoded in the URL on the Web page containing the VBScript code segment (shown above), to the ProcessRequest( ) method, a GUID is created to serve as the content identifier. The content identifiers are formed into a list structured as a cookie map and stored as session state in the Web server 17.

In the described embodiment, six information attributes are stored for every HTML form element, such as "INPUT," "SELECT," or "TEXTAREA."The GUID and six information attributes are collectively referred to as a "cookie." The six information attributes are shown in Table 1. The cookie values are shown below in Table 2. The listed information attributes and cookie values are non-exclusive and other information attributes and cookie values are possible.

TABLE 1

| Information Attribute Name | Description |
| --- | --- |
| (1) CMFCookieType | Cookie type |
| (2) Name | XML node attribute name |
| (3) ClassName | XML element node name |
| (4) ParentID | Stores identifier attribute of parent XML element node |
| (5) ItemID | Identifier attribute of XML element node |
| (6) Value | Stores value of custom HTML form controls |

TABLE 2

| Cookie Name | Value |
| --- | --- |
| (1) CMFAttribute | Cookie type |
| (2) CMFAddButton | XML node attribute name |
| (3) CMFDeleteButton | XML element node name |
| (4) CMFFileName | Stores identifier attribute of parent XML element node |
| (5) CMFDeleteFileName | Identifier attribute of XML element node |

Next, the XML template is retrieved from the file system and converted into objects in accordance with the content management framework object model 60 (block 182). The root XML node maps to the CMFTemplate class 62, "class" elements map to CMFClass classes 63, "property" elements map to CMFProperty objects 65, and "collection" elements map to a collection of CMFClass classes 66. An exemplary XML code segment representing an XML template converted into objects is as follows:

```
<?xml version="1.0"?>
<objectmodel id="123 . . . ">
    <class id="234 . . . " name="" alias="">
        <property id="345 . . . " name="" alias="" required=
        "" control
            ="" datatype="" sizewidth="" sizeheight=""
                maxlength="" listvalues="" defaultvalue=""/>
        <collection id="456 . . . " name="" alias=""
            quantity="" class=""/>
    </class>
</objectmodel>
```

The system Registry contains a list of template identifiers and corresponding adapters. Consequently, if no adapter is supplied for a given template, a default adapter, such as CMFDefaultDocumentAdapter 84 or CMFDefaultTemplateAdapter 85 (both shown in FIG. 5) is selected and instantiated (block 183). The remainder of the process depends upon whether an HTTP "POST" or HTTP "GET" request is received (block 184). If an HTTP "GET" request is received (block 184), the process begins form building (blocks 185–188). Otherwise, if an HTTP "POST" request is received (block 184), the process begins form updating (blocks 189–198). Form building (blocks 185–188) will now be described.

Figure 10:
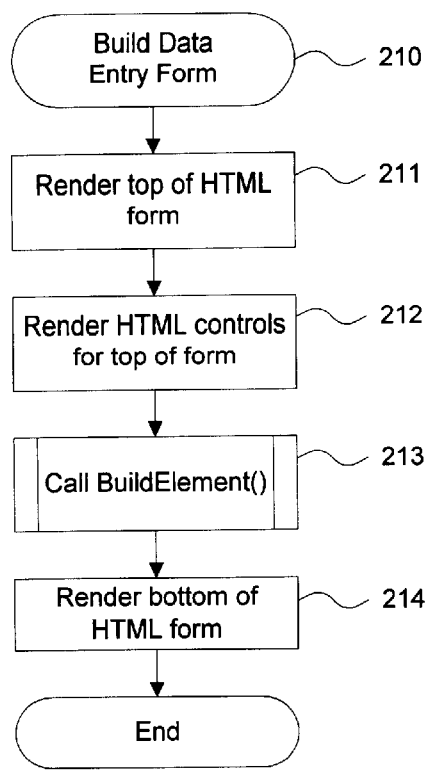
FIG. 10 is a block diagram showing the routine for building a data entry form for use in the process of FIG. 9.

Form building begins with determining whether new content is being created. Thus, if a content identifier was not provided as an input parameter encoded in the URL on the Web page containing the VBScript code segment (shown above) (block 185), new content is being created and the routine for building a data entry form, BuildHTMLEntryForm( ), as further described below with reference to FIG. 10, is called to render a blank HTML data entry form (block 186). The process then terminates.

Otherwise, if a content identifier was provided as an input parameter (block 185), the content to be displayed in the form already exists within the file system. The XML file identified by the content identifier provided as the input parameter is read (block 187) and the BuildHTMLEntryForm( ) routine is called to render an HTML data entry form containing data from the previously read XML file (block 188). The process then terminates.

Form updating begins with retrieving the XML content containing the content data for the data entry form (block 189). The XML content can come from several sources. In the described embodiment, XML content is written to a browser application in a hidden text field during request processing. Alternately, XML content can be stored as session state with the host environment. HTTP is a stateless protocol which does not allow XML content from previous request processing to persist. The retrieved XML content is then updated with the new data values received as input parameters of the HTTP "POST" request (block 190).

There are three form-updating options. First, if either the "+" or "−" button is pressed (block 191), XML nodes are added or removed from the XML content (block 194). Thus, pressing the "+" button will add a class of controls to the data entry form while pressing the "−" button will delete a class of controls. The controls can be hierarchically structured with each successive generation of controls contained in the parent control class. The BuildHTMLEntryForm( ) routine is called to render the data entry form with the updated data and with any requested HTML controls added or removed (block 195). The process then terminates.

Second, if either the "Save" or "Blackout" button is pressed (block 192), the content in the data entry form must be validated and persisted to the file system and metadata about the content must be updated. In the described embodiment, pressing the "Blackout" button causes the same action as does pressing the "Save" button, except an internal flag is set to indicate that the data is not available for modification. The BuildHTMLEntryForm( ) routine is called to validate the data as the data entry form is built (block 196). Finally, the XML content is persisted to a file and the metadata about the content is stored into the database 21 via an adapter (block 197). The process then terminates.

Third, if the "Delete" button is pressed (block 193), all files and metadata relating to the content must be removed. The XML file for the current data entry form is removed from the file system, along with any other files used to retrieve the content of the data entry form (block 198). In addition, the metadata is removed from the database 21 via an adapter. The process then terminates.

Upon the termination of the process, the host environment proceeds with sending the requested Web page 59 (shown in FIG. 4) to the client browser or redirects the client browser to another HTML page using the name of the Web page 59 passed as an input parameter into the process.

FIG. 10 is a block diagram showing the routine 210 for building a data entry form, BuildHTMLEntryForm( ), for use in the process of FIG. 9. This routine has no input parameters. The purpose of this routine is to render a data entry form, such as described above. First, the top of the data entry form is rendered (block 211) by sending the HTML source code for the top of the data entry form to the browser application. The data entry controls, which in the described embodiment are written in HTML, are written to the data entry form by the selected adapter (block 212). The content identifier, content name, template name, and revision note are written out. Next, the routine for building an element, BuildHTMLElement( ), is called (block 213) with the following parameters, as used, by way of example, in the described embodiment: the content XML root node and the root CMFClass instance. Finally, the bottom of the data entry form is rendered (block 214) by sending the HTML source code to create the "Save," "Blackout," "Delete," and "Cancel" buttons. The routine then returns.

Figure 11:
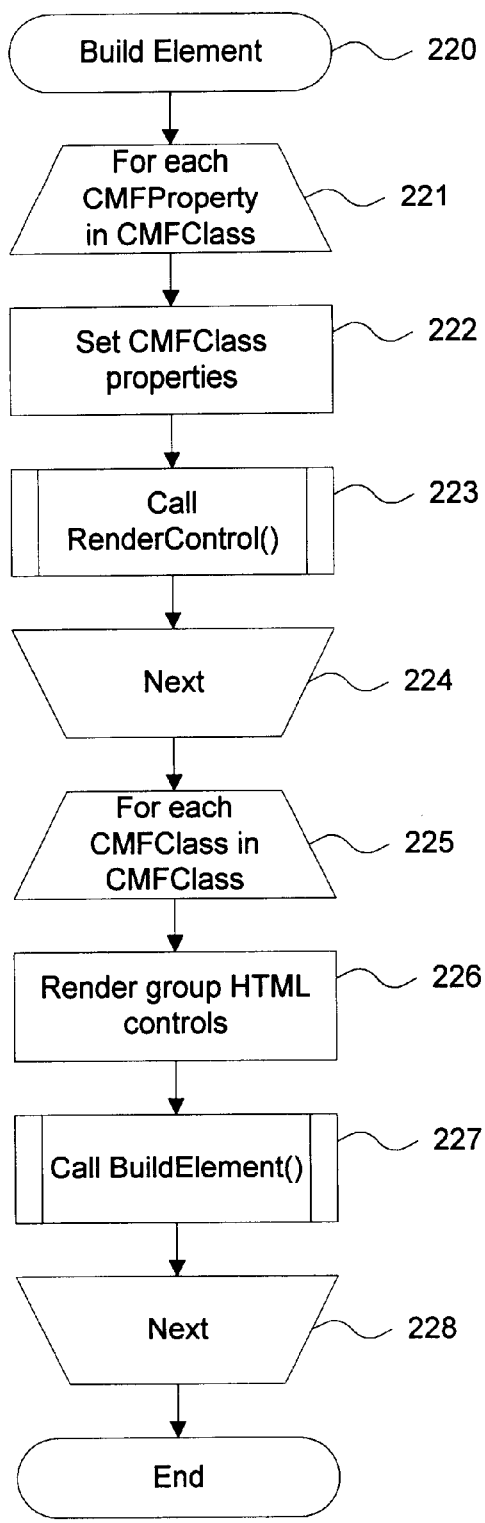
FIG. 11 is a block diagram showing the routine for building an element for use in the process of FIG. 9.

FIG. 11 is a block diagram showing the routine 220 for building an element, BuildHTMLElement( ), for use in the process of FIG. 9. The purpose of this routine is to recursively walk through an CMFTemplate class 62 hierarchy and to map values from XML content to CMFProperty objects 65. A VisualBasic code segment for starting the routine is as follows:

```
Sub BuildHTMLElement(ByRef DataNode As
    MSXML.IXMLDOMNode, ByRef TemplateClass As
    CMFFormClass)
```

The routine operates in two iterative processing loops for mapping values to CMFProperty objects 65 (blocks 221–224) and rendering by CMFClass classes 63 (blocks 225–228). Other forms of iterative, recursive, or enumerative processing, including concurrent processing, are possible. Each CMFProperty object 65 encapsulated within the CMFClass class 63 for the current data entry form is processed during each iteration of the first processing loop (block 221) as follows: First, the value of the CMFProperty object 65 is set to the content value of an associated XML node (block 222). Next, each control set in the CMFProperty object 65 is rendered by calling the routine for controlling rendering, RenderControl( ), as further described below with reference to FIG. 12 (block 223). Processing continues for each successive CMFProperty object 65 (block 224).

Each child CMFClass class 63 encapsulated within the parent CMFClass class 63 for the current data entry form is processed during each iteration of the second processing loop (block 225) as follows. First, based on the "Quantity" property of the child CMFClass class 63, a group of controls are rendered, preferably as HTML source code (block 226). Group controls refer to labels, and "+" and "−" buttons for a group of controls. For example, a "+" button above a group of rendered controls causes the creation of another, subordinate group of controls. The rules describing the number of controls to render are shown below in Table 3.

TABLE 3

| Quantity | Description |
| --- | --- |
| ? | zero or one controls |
| * | zero or more controls |
| + | one or more controls |
| n+ | n or more controls |
| n− | n or less controls |
| n | n and only n controls |
| x–y | at least x and up to y controls |

Next, the routine recursively calls itself, BuildHTMLElement( ) with the following parameters, as used, by way of example, in the described embodiment: the current XML node and the CMFClass class 63 (block 227). With each recursive call, the CMFProperty objects 65 encapsulated within the CMFClass class 63 are rendered as controls in the data entry form. Processing continues for each successive child CMFClass class 63 (block 228). The routine then returns.

Figure 12:
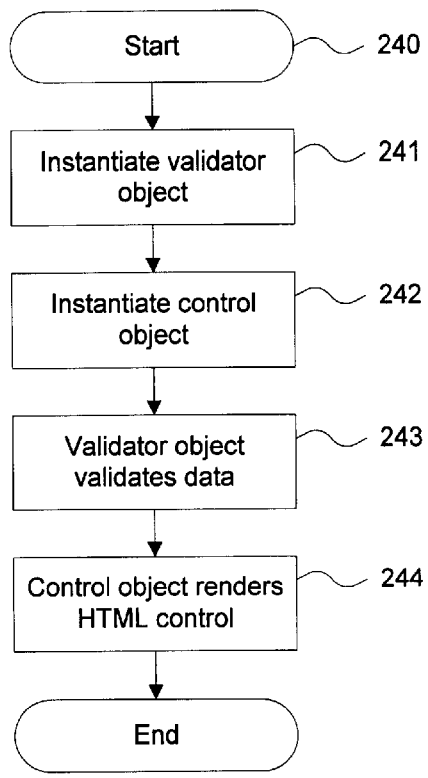
FIG. 12 is a block diagram showing a process for controlling object rendering for use in the routine of FIG. 9.

FIG. 12 is a block diagram showing a process 240 for controlling object rendering, RenderControl( ), for use in the routine of FIG. 11. RenderControl( ) is a method of each CMFProperty object 65. The purpose of this routine is to facilitate the rendering of controls appearing on the data entry form. The controls are preferably written as HTML source code, although any language capable of rendering user controls on a Web page is suitable.

A validator object, selected from the validators class group 69 (shown in FIG. 5) is instantiated for validating data based on a data type (block 241). In addition to those validator objects described in the validators class group 69, custom validator objects can be written for new, derived data types, such as for validating a Social Security number or telephone number. The data types supported in the described embodiment and the validator objects instantiated to handle these data types are shown below in Table 4.

TABLE 4

| Data Type | CMF Validator Class To Instantiate |
| --- | --- |
| (1) document | CMFValidatorDocument |
| (2) date | CMFValidatorDate |
| (3) emailaddress | CMFValidatorEmailAddress |
| (4) list | CMFValidatorDefault |
| (5) file | CMFValidatorDefault |
| (6) number | CMFValidatorNumber |
| (7) string | CMFValidatorDefault |
| (8) url | CMFValidatorURL |

A control object, selected from the controls class group 68 (shown in FIG. 5) is instantiated for generating the source code, preferably in HTML, for each control in the data entry form (block 242). Preferably, each control includes a graphical user interface, but other forms of controls are also suitable. In addition, custom control objects can be written to expand the functionality of the basic controls. The controls supported in the described embodiment and the control classes that should be instantiated to handle these controls are shown below in Table 5.

TABLE 5

| Control Name | CMF Control Class To Instantiate |
| --- | --- |
| (1) checkbox | CMFControlCheckbox |
| (2) radio | CMFControlRadio |
| (3) multiselectlist | CMFControlMultiSelectList |
| (4) singleselectlist | CMFControlSingleSelectList |
| (5) textarea | CMFControlTextArea |
| (6) textfield | CMFControlTextField |
| (7) fileupload | CMFControlFileUpload |

Next, the data is validated, using the instantiated validator object, to ensure a match with the proper data type (block 243). For example, if the data type is "number" and the data is not numeric, the data is invalid. Finally, the source code, preferable HTML, is sent to the browser application to render the appropriate control (block 244). The value of the control is set to the value of the instantiated validator object which refers to a specific field or property. A GUID for the control name is created and added to the cookie map for the control, along with the information attributes described the control being created. The routine then returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for managing content organized in a tag-delimited template using metadata, comprising:
   a template written in a tag-delimited language and retrieved from a data store;
   a content management framework converting the retrieved template into an object representation of a metadata entry form and initializing a user interface exported by the object representation, the content management framework comprising:
      a form builder building a data entry form comprising individual data entry elements responsive to user selections on the user interface of the metadata form, each data entry element comprising a set of information attributes describing the data entry element, wherein at least one of the data entry elements is nested within another data entry element;
      an element builder defining the data entry elements of the data entry form as one or more classes within the retrieved template and rendering the data entry form, the element builder enumerating each of the one or more classes of the stored template;
      a render controller generating each data entry element of the one or more enumerated classes as described by the set of information attributes;
   an object model encapsulating the one or more classes corresponding to the at least one nested data entry element within the class corresponding to the another data entry element; and
   the element builder recursively enumerating the one or more classes as the data entry form is rendered.

2. A system according to claim 1, further comprising:
   a cookie map retrieved from the data store and associated with the stored template, the cookie map comprising a list of cookies which each uniquely identify one such data entry element within the data entry form and the set of information attributes describing that data entry element;

the element builder generating each data entry element of the data entry form using the set of information attributes stored in the cookie for that data entry element.

3. A system according to claim 1, further comprising:

content retrieved from the data store and corresponding to each data entry element of the rendered data entry form; and a validator validating the retrieved content during the generation of the data entry element.

4. A system according to claim 1, further comprising:

an adapter adapting the data entry form from the tag-delimited language into a Web page representation.

5. A system according to claim 1, wherein each data entry element comprises a control and the one or more classes corresponding to the control each comprise a set of properties.

6. A system according to claim 5, wherein the control is selected from at least one member of the group comprising a checkbox, radio buttons, multi-line selection list, single-line selection list, text area, text field, and file upload.

7. A system according to claim 5, further comprising:

the element builder associating a validator with each control; and the render controller validating content input via the control.

8. A system according to claim 7, wherein the validator is selected from at least one member of the group comprising a document, date, electronic mail address, list, file, number, string, and Uniform Resource Locator.

9. A process for managing content organized in tag-delimited template using metadata, comprising:

retrieving a stored template written in a tag-delimited language;

converting the retrieved template into an object representation of a metadata entry form;

initializing a user interface exported by the object representation;

building a data entry form comprising individual data entry elements responsive to user selections on the user interface of the metadata form, each data entry element comprising a set of information attributes describing the data entry element, wherein at least one of the data entry elements is nested within another data entry element;

defining the data entry elements of the data entry form as one or more classes within the retrieved template;

rendering the data entry form, comprising:

enumerating each of the one or more classes of the stored template; and generating each data entry element of the one or more enumerated classes as described by the set of information attributes;

encapsulating the one or more classes corresponding to the at least one nested data entry element within the class corresponding to the another data entry element; and recursively enumerating the one or more classes as the data entry form is rendered.

10. A process according to claim 9, further comprising:

retrieving a cookie map associated with the stored template, the cookie map comprising a list of cookies which each uniquely identify one such data entry element within the data entry form and the set of information attributes describing that data entry element;

generating each data entry element of the data entry form using the set of information attributes stored in the cookie for that data entry element.

11. A process according to claim 9, further comprising:

retrieving stored content corresponding to each data entry element of the rendered data entry form; and validating the retrieved content during the generation of the data entry element.

12. A process according to claim 9, further comprising:

adapting the data entry form from the tag-delimited language into a Web page representation.

13. A process according to claim 9, wherein each data entry element comprises a control and the one or more classes corresponding to the control each comprise a set of properties.

14. A process according to claim 13, wherein the control is selected from at least one member of the group comprising a checkbox, radio buttons, multi-line selection list, single-line selection list, text area, text field, and file upload.

15. A process according to claim 13, further comprising:

associating a validator with each control; and validating content input via the control.

16. A process according to claim 15, wherein the validator is selected from at least one member of the group comprising a document, date, electronic mail address, list, file, number, string, and Uniform Resource Locator.

17. A computer-readable storage medium holding code for managing content organized in a tag-delimited template using metadata, comprising:

retrieving a stored template written in a tag-delimited language;

converting the retrieved template into an object representation of a metadata entry form;

initializing a user interface exported by the object representation;

building a data entry form comprising individual data entry elements responsive to user selections on the user interface of the metadata form, each data entry element comprising a set of information attributes describing the data entry element, wherein at least one of the data entry elements is nested within another data entry element;

defining the data entry elements of the data entry form as one or more classes within the retrieved template;

rendering the data entry form, comprising:

enumerating each of the one or more classes of the stored template; and generating each data entry element of the one or more enumerated classes as described by the set of information attributes encapsulating the one or more classes corresponding to the at least one nested data entry element within the class corresponding to the another data entry element; and recursively enumerating the one or more classes as the data entry form is rendered.

18. A storage medium according to claim 17, further comprising:

retrieving a cookie map associated with the stored template, the cookie map comprising a list of cookies which each uniquely identify one such data entry element within the data entry form and the set of information attributes describing that data entry element;

generating each data entry element of the data entry form using the set of information attributes stored in the cookie for that data entry element.

19. A storage medium according to claim 17, further comprising:

retrieving stored content corresponding to each data entry element of the rendered data entry form; and validating the retrieved content during the generation of the data entry element.

20. A storage medium according to claim 17, further comprising:

adapting the data entry form from the tag-delimited language into a Web page representation.

21. A storage medium according to claim 17, wherein each data entry element comprises a control and the one or more classes corresponding to the control each comprise a set of properties.

22. A storage medium according to claim 21, further comprising:

associating a validator with each control; and validating content input via the control.

23. A system for managing Web content using metadata on a content management framework, comprising:

a template stored in a data store and defining a set of properties of and characterizing one or more data entry controls for use in a data entry form, the data entry controls and the properties formed into classes comprising metadata, wherein the class are recursively definable;

a form builder exposing an interface of the template that defines a public method with which the data entry form can be built;

an element builder building the data entry form as a set of Web page elements responsive to a call to the public method of the template, comprising setting the one or more properties of the data entry form for each metadata class and creating the one or more data entry controls within the data entry form for each metadata class;

a render controller rendering the data entry form as source code in a tag-delimited page description language; and the element builder enumerating each recursively defined class and recursively generating the one or more data entry controls and the properties for each such recursively defined class.

24. A system according to claim 23, wherein each data entry control comprises at least one member of the group comprising a checkbox control, a file upload control, a multi-line selection control, a radio button control, a single-line selection control, a text area control, and a text field control.

25. A system according to claim 23, further comprising:

the element builder associating a validator with each data entry control within the data entry form, the validator performing validation of data entered into the data entry form through the data entry control.

26. A system according to claim 25, wherein the validator comprises at least one member of the group comprising a date validator, a default validator, a document validator, an electronic mail address validator, a number validator, and a Uniform Resource Locator (URL) validator.

27. A system according to claim 23, further comprising:

the element builder associating an adapter with the data entry form, the adapter modifying rendering of the data entry form based on the template type.

28. A system according to claim 27, wherein the adapter comprises at least one member of the group comprising a default document adapter and a default template adapter.

29. A system according to claim 23, wherein the data entry form is new data entry form, further comprising:

form builder determining whether the new data entry form is associated with stored Web page content and retrieving the associated stored Web page content into the new data entry form if such association exists.

30. A system according to claim 23, wherein the data entry form is an existing data entry form, further comprising:

the form builder retrieving stored Web page content associated with the existing data entry form, updating the existing data entry form with the retrieved Web page content, and modifying the existing data entry form responsive to a user request during the processing of the template.

31. A system according to claim 30, further comprising:

the form builder recursively defining one or more data entry controls as a child class contained within a parent class responsive to a user selection on the interface of the template.

32. A system according to claim 23, further comprising:

a Web server executing the data entry form and storing Web content received therefrom in the data store and rendering Web pages based on the stored Web content retrieved from the data store.

33. A system according to claim 23, wherein the content management framework is embodied as an object model in an object-oriented programming language.

34. A process for managing Web content using metadata in a content management framework, comprising:

processing a template defining a set of properties of and characterizing one or more data entry controls for use in a data entry form, the data entry controls and the properties formed into classes comprising metadata, wherein the classes are recursively definable;

exposing an interface of the template that defines a public method with which the data entry form can be built;

building the data entry form as a set of Web page elements responsive to a call to the public method of the template, comprising:

setting the one or more properties of the data entry form for each metadata class;

creating the one or more data entry controls within the data entry form for each metadata class;

rendering the data entry form as source code in a tag-delimited page description language;

enumerating each recursively defined class; and recursively generating the one or more data entry controls and the properties for each such recursively defined class.

35. A process according to claim 34, wherein each data entry control comprises at least one member of the group comprising a checkbox control, a file upload control, a multi-line selection control, a radio button control, a single-line selection control, a text area control, and a text field control.

36. A process according to claim 34, the operation of processing the template further comprising:

associating a validator with each data entry control within the data entry form, the validator performing validation of data entered into the data entry form through the data entry control.

37. A process according to claim 36, wherein the validator comprises at least one member of the group comprising a date validator, a default validator, a document validator, an electronic mail address validator, a number validator, and a Uniform Resource Locator (URL) validator.

38. A process according to claim 34, the operation of processing the template further comprising:

associating an adapter with the data entry form, the adapter modifying rendering of the data entry form based on the template type.

39. A process according to claim 38, wherein the adapter comprises at least one member of the group comprising a default document adapter and a default template adapter.

40. A process according to claim 34, wherein the data entry form is new data entry form, further comprising:

determining whether the new data entry form is associated with stored Web page content; and retrieving the associated stored Web page content into the new data entry form if such association exists.

41. A process according to claim 34, wherein the data entry form is an existing data entry form, further comprising:

retrieving stored Web page content associated with the existing data entry form;

updating the existing data entry form with the retrieved Web page content; and modifying the existing data entry form responsive to a user request during the processing of the template.

42. A process according to claim 41, further comprising:

recursively defining one or more data entry controls as a child class contained within a parent class responsive to a user selection on the interface of the template.

43. A process according to claim 34, further comprising:

executing the data entry form and storing Web content received therefrom in a data store; and rendering Web pages based on the stored Web content retrieved from the data store.

44. A process according to claim 34, wherein the content management framework is embodied as an object model in an object-oriented programming language.

45. A computer-readable storage medium holding code for managing Web content using metadata in a content management framework, comprising:

processing a template defining a set of properties of and characterizing one or more data enter controls for use in a data entry form, the data entry controls and the properties formed into classes comprising metadata, wherein the classes are recursively definable;

exposing an interface of the template that defines a public method with which the data entry form can be built;

building the data entry form as a set of Web page elements responsive to a call to the public method of the template, comprising:

setting the one or more properties of the data entry form for each metadata class;

creating the one or more data entry controls within the data entry form for each metadata class;

rendering the data entry form as source code in a tag-delimited page description language;

enumerating each recursively defined class; and recursively generating the one or more data entry controls and the properties for each such recursively defined class.

46. A storage medium according to claim 45, the operation of processing the template further comprising:

associating a validator with each data entry control within the data entry form, the validator performing validation of data entered into the data entry form through the data entry control.

47. A storage medium according to claim 45, the operation of processing the template further comprising:

associating an adapter with the data entry form, the adapter modifying rendering of the data entry form based on the template type.

48. A storage medium according to claim 45, wherein the data entry form is new data entry form, further comprising:

determining whether the new data entry form is associated with stored Web page content; and retrieving the associated stored Web page content into the new data entry form if such association exists.

49. A storage medium according to claim 45, wherein the data entry form is an existing data entry form, further comprising:

retrieving stored Web page content associated with the existing data entry form;

updating the existing data entry form with the retrieved Web page content; and modifying the existing data entry form responsive to a user request during the processing of the template.

50. A storage medium according to claim 49, further comprising:

recursively defining one or more data entry controls as a child class contained within a parent class responsive to a user selection on the interface of the template.

51. A storage medium according to claim 45, further comprising:

executing the data entry form and storing Web content received therefrom in the data store; and rendering Web pages based on the stored Web content retrieved from the data store.

* * * * *

UNITED STATES PATENT AND TRADEMARK OFFICE
CERTIFICATE OF CORRECTION

PATENT NO. : 6,732,331 B1 Page 1 of 1
APPLICATION NO. : 09/504624
DATED : May 4, 2004
INVENTOR(S) : Vlad Alexander It is certified that error appears in the above-identified patent and that said Letters Patent is hereby corrected as shown below:

Title page, item (56), under "OTHER PUBLICATIONS" please insert the following publications:

Vignette, "The Standard for Team-Based Collaboration," http://www.vignette.com/CDA/site/0,2097,1-1-731-1191-735-1192,FF.html.
Vignette, "The Right Content at the Right Time," http://www.vignette.com/CDA/Site/0,2097,1-1-731-1191-735-1193,FF.html.
NCompass Labs Inc., "Key Features," http://www.ncompasslabs.com/Products/Product+Description/Key+Features.htm.
Macromedia, "Dreamweaver 3 Product Info," http://www.macromedia.com/software/dreamweaver/productinfo/html.
Macromedia, "Dreamweaver 3 Hot New Features in Dreamweaver 3," http://www.macromedia.com/software/dreamweaver/productinfo/newfeatures/00_newfeatures.htm.
Microsoft, "Microsoft FrontPage," http://www.microsoft.com/frontpage.
Microsoft, "FrontPage 2000 Tour," http://www.microsoft.com/frontpage/2000/fp2kpg1.htm.
Allaire Spectra, "Frequently Asked Questions," http://www.allaire.com/Products/Spectra/Faq.cfm#_Toc457017848.
Interwoven, "Web Site Templating," http://www.Interwoven.com/developer/products/templating.html.
Abortext, "Adept Editor," http://arbortext.com/Products/Base_Products/Adept_Editor/body_adept_editor.html.

Signed and Sealed this

Seventh Day of April, 2009

JOHN DOLL
*Acting Director of the United States Patent and Trademark Office*